(12) United States Patent
Albers et al.

(10) Patent No.: US 7,451,820 B2
(45) Date of Patent: Nov. 18, 2008

(54) METHOD FOR FRACTURE STIMULATING WELL BORES

(75) Inventors: Blair Albers, Calgary (CA); Bradley A. Rieb, Calgary (CA); Tim Leshchyshyn, Calgary (CA); James D. Thomson, Calgary (CA); Victor E. Fordyce, Red Deer County (CA)

(73) Assignee: BJ Services Company, Houston, TX (US)

( * ) Notice: Subject to any disclaimer, the term of this patent is extended or adjusted under 35 U.S.C. 154(b) by 314 days.

(21) Appl. No.: 11/118,231

(22) Filed: Apr. 29, 2005

(65) Prior Publication Data

US 2006/0243437 A1 Nov. 2, 2006

(51) Int. Cl.
 *E21B 43/26* (2006.01)
(52) U.S. Cl. ............. 166/308.6; 166/280.1; 166/250.01
(58) Field of Classification Search ........................ None
 See application file for complete search history.

(56) References Cited

U.S. PATENT DOCUMENTS 4,126,181 A * 11/1978 Black ...................... 166/280.2
4,176,064 A * 11/1979 Black ........................... 210/196

FOREIGN PATENT DOCUMENTS

| CA | 1 215 640 | 12/1986 |
|---|---|---|
| CA | 1 220 412 | 4/1987 |

\* cited by examiner

*Primary Examiner*—Jennifer H Gay
*Assistant Examiner*—Kerry W Leonard
(74) *Attorney, Agent, or Firm*—Howrey LLP (57) ABSTRACT

Disclosed is a method for fracture stimulating well bores using gaseous nitrogen and/or liquid carbon dioxide combined with a partially dehydrated proppant. The method includes mixing proppant with a fracturing fluid to create a proppant-laden slurry, removing the majority of the fluid from the proppant using centrifugal forces, blending the proppant with gaseous nitrogen and/or liquid carbon dioxide, and thereafter utilizing that combination to fracture-stimulate well bores. The method also includes the use of monitoring and flow control equipment to regulate and/or automate the method.

59 Claims, 7 Drawing Sheets

| STAGE # | STAGE TYPE | ELAPSED TIME MIN:SEC | FLUID TYPE | CLEAN VOLUME (m3) | PROP CONC (kg/m3) | STAGE PROP. (tonnes) | SLURRY RATE (m3/ml,n) | PROPPANT TYPE |
|---|---|---|---|---|---|---|---|---|
| WELLBORE FLUID | | | N2 / WATER | 0.000 | | | | |
| 1 | MAIN FRAC PAD | 6:15 | N2 / WATER | 50.000 | 0 | 0.0 | 8.00 | |
| 2 | MAIN FRAC SLURRY | 6:52 | N2 / WATER | 5.000 | 25 | 0.1 | 8.00 | OTTAWA-2040 |
| 3 | MAIN FRAC SLURRY | 8:09 | N2 / WATER | 10.000 | 50 | 0.5 | 8.00 | OTTAWA-2040 |
| 4 | MAIN FRAC SLURRY | 10:04 | N2 / WATER | 15.000 | 75 | 1.1 | 8.00 | OTTAWA-2040 |
| 5 | MAIN FRAC SLURRY | 12:40 | N2 / WATER | 20.000 | 100 | 2.0 | 8.00 | OTTAWA-2040 |
| 6 | MAIN FRAC SLURRY | 15:17 | N2 / WATER | 20.000 | 125 | 2.5 | 8.00 | OTTAWA-2040 |
| 7 | MAIN FRAC SLURRY | 18:35 | N2 / WATER | 25.000 | 150 | 3.8 | 8.00 | OTTAWA-2040 |
| 8 | MAIN FRAC FLUSH | 18:41 | N2 / WATER | 0.800 | 0 | 0.0 | 8.00 | |

| STAGE # | STAGE TYPE | ELAPSED TIME MIN:SEC | FLUID TYPE | CLEAN VOLUME (m3) | PROP CONC 1 (kg/m3) | PROP CONC 2 (kg/m3) | STAGE PROP. (tonnes) | SLURRY RATE1 (m3/m1,n) | SLURRY RATE 2 (m3/m1,n) | PROPPANT TYPE |
|---|---|---|---|---|---|---|---|---|---|---|
| | WELLBORE FLUID | | N2 / WATER | 0.000 | | | | | | |
| 1 | MAIN FRAC PAD | 6:15 | N2 / WATER | 50.000 | 0 | 0 | 0.0 | 8.00 | 8.00 | |
| 2 | MAIN FRAC SLURRY | 6:52 | N2 / WATER | 5.000 | 0 | 25 | 0.1 | 8.00 | 8.00 | OTTAWA-2040 |
| 3 | MAIN FRAC SLURRY | 8:08 | N2 / WATER | 10.000 | 25 | 50 | 0.4 | 8.00 | 8.00 | OTTAWA-2040 |
| 4 | MAIN FRAC SLURRY | 10:03 | N2 / WATER | 15.000 | 50 | 75 | 0.9 | 8.00 | 8.00 | OTTAWA-2040 |
| 5 | MAIN FRAC SLURRY | 12:38 | N2 / WATER | 20.000 | 75 | 100 | 1.7 | 8.00 | 8.00 | OTTAWA-2040 |
| 6 | MAIN FRAC SLURRY | 15:15 | N2 / WATER | 20.000 | 100 | 125 | 2.2 | 8.00 | 8.00 | OTTAWA-2040 |
| 7 | MAIN FRAC SLURRY | 18:32 | N2 / WATER | 25.000 | 125 | 150 | 3.4 | 8.00 | 8.00 | OTTAWA-2040 |
| 8 | MAIN FRAC FLUSH | 18:38 | N2 / WATER | 0.800 | 0 | 0 | 0.0 | 8.00 | 8.00 | |

METHOD FOR FRACTURE STIMULATING WELL BORES

BACKGROUND OF THE INVENTION

Various methods are known in the prior art for stimulating the production of oil and natural gas from wells drilled in formations with low permeability. One of the most widely used methods involves the hydraulic fracturing of low permeability formations using one of a variety of water-containing fracturing fluids intermixed with proppants such as sand, glass beads, and the like. Hydraulic pressure is applied to the formation and causes stresses in the rock of the formation surrounding the well bore. These stresses trigger the splitting or "fracturing" of the rock. The initially formed fractures are then extended by the injection of fluids containing a proppant into the fractures. The hydraulic pressure is then released and the proppant which had been previously deposited in the fractures serves to hold the fractures open such that channels are created for reservoir fluids to flow to the well bore and subsequently to the surface.

Another prior art technique for stimulating reservoirs involves the hydraulic fracturing of low permeability formations using foam. The foam is formed by blending sand or another suitable proppant into a gelled water solution and treating the resulting slurry with a surfactant. A gas, such as nitrogen or carbon dioxide, is then injected into the slurry to create a high-pressure foam. The foam/proppant mixture is then used to fracture the formation as described above. Foam fracturing has several advantages over fracturing techniques using conventional fracturing fluids. The foam has a low fluid loss and has the ability to create larger area fractures with equivalent volumes of treatment fluid. Since fluid loss to the formation is minimized, the chance of damaging sensitive formations is lessened. Foam fracturing systems are of particular benefit in gas or oil reservoirs of low reservoir pressure.

A more recent development in well fracturing involves the use of gaseous nitrogen alone as a fracturing agent. The water content of fracturing fluids is extremely crucial when treating water-sensitive formations (such as coal bed methane formations) since water can cause clay migration and swelling in the formation, thereby reducing permeability to the produced fluids. Gaseous nitrogen, on the other hand, is inert, relatively insoluble, and compressible. Using gaseous nitrogen as a fracturing agent virtually eliminates the clean-up problems associated with water-based systems. Once the treatment is completed, the well is opened up and the gaseous nitrogen is flowed back to the surface. Production fluids are not lost and costly swabbing units used to recover the water are not needed.

Although gaseous nitrogen fracturing has many advantages over traditional water-based and foam fracturing techniques, there exists a need for a gaseous nitrogen fracturing technique that includes the simultaneous placement of an effective amount of proppant within the fractured formation surrounding the well bore. An effective amount of proppant serves to hold the fractures open such that channels are created for reservoir fluids to flow to the well bore and subsequently to the surface, thereby stimulating the well. The following invention addresses that need.

SUMMARY OF THE INVENTION

This invention relates to a method for fracture stimulating well bores using gaseous nitrogen and/or liquid carbon dioxide combined with substantially dehydrated proppant.

In a first embodiment of the present invention, a blender unit draws fluid from a fluid storage device, draws proppant from a sand trailer, and mixes the two in a blender tub to form a slurry. Once the fluid/proppant slurry is properly mixed, the blender unit discharges the slurry into a high-pressure pump. The high-pressure pump sends the slurry under high pressure to a sand intensifier unit. The slurry enters the sand intensifier unit at an intake flange and is forced into a centralized cone-shaped receptacle. The design of the cone-shaped receptacle effectively creates a centrifuge. This centrifuge creates centrifugal force, which in conjunction with gravity removes the majority of fluid from the proppant, thereby resulting in a more concentrated slurry. The partially dehydrated or "wet" proppant drops to the bottom of the cone-shaped receptacle and exits the sand intensifier unit via an outlet flange. The separated fluid is forced to the top of the cone-shaped receptacle and is removed from the sand intensifier unit via a reflux flange. The separated fluid is then returned to the fluid storage device.

The wet proppant is forced into a conduit that carries the proppant to a manifold fitting. Simultaneously, a first nitrogen/carbon dioxide storage tank and pump forces gaseous nitrogen, liquid carbon dioxide, or a combination of both, under high pressure through another conduit until it reaches the same manifold fitting. Once at the manifold fitting, the nitrogen/carbon dioxide combines with the wet proppant and delivers it to the wellhead. The combined stream of wet proppant and gaseous nitrogen/liquid carbon dioxide is then pumped through the wellhead and tubing/casing into the well to fracture-stimulate the formation. The partially dehydrated nature of the proppant allows a higher proppant concentration to be delivered to the wellhead as opposed to pumping the proppant-laden slurry directly from the high-pressure pump. At the same time the combined stream of wet proppant and gaseous nitrogen/liquid carbon dioxide is being pumped to the wellhead, a second nitrogen/carbon dioxide storage tank and pump delivers a proppant-free, high-pressure stream of gaseous nitrogen, liquid carbon dioxide, or a combination of both, through the second wellhead conduit to further the efficacy of the fracture-stimulation.

Monitoring and control equipment allow the process of delivering the wet proppant to the wellhead to be accomplished using a "step" procedure, where a measured amount of proppant is introduced into the formation, followed by an increased amount, followed by a further increased amount, and so on until the proper proppant concentration is attained. The monitoring and control equipment alternatively allow the process to be accomplished using a "ramp" procedure, where an initially small, but steadily and constantly increasing amount of proppant is introduced into the formation until the proper concentration is attained. The monitoring and control equipment also allow the method as disclosed above to be highly automated. The entire method may be managed electronically and remotely. Further, because the entire system is monitored and flow manipulated, the method may be performed in compliance with a predetermined engineering program.

The present invention essentially comprises a method of fracture stimulating a formation in a subterranean well bore, the method including the steps of mixing proppant with a fluid to form a slurry, removing a substantial portion of the fluid from the slurry using centrifugal forces and gravity to thereby create a partially dehydrated slurry, combining the partially dehydrated slurry with gaseous nitrogen, and pumping the partially dehydrated slurry and gaseous nitrogen into the well bore at a pump rate and pressure sufficient to fracture stimulate the formation.

The present invention also comprises an alternative method of fracture stimulating a formation in a subterranean well bore, the method including the steps of mixing proppant with a fluid to form a slurry, removing a substantial portion of the fluid from the slurry using centrifugal forces and gravity to thereby create a partially dehydrated slurry, combining the partially dehydrated slurry with liquid carbon dioxide, and pumping the partially dehydrated slurry and liquid carbon dioxide into the well bore at a pump rate and pressure sufficient to fracture stimulate the formation.

The present invention further comprises yet another method of fracture stimulating a formation in a subterranean well bore, this method including the steps of mixing proppant with a fluid to form a slurry, removing a substantial portion of the fluid from the slurry using centrifugal forces and gravity to thereby create a partially dehydrated slurry, combining the partially dehydrated slurry with a mixture of liquid carbon dioxide and gaseous nitrogen, and pumping the partially dehydrated slurry and the mixture of carbon dioxide and gaseous nitrogen into the well bore at a pump rate and pressure sufficient to fracture stimulate the formation.

Additional objects and advantages of the invention will become apparent as the following detailed description of the preferred embodiment is read in conjunction with the drawings.

BRIEF DESCRIPTION OF THE DRAWINGS

FIGS. 2(a-c) illustrate multiple views of the sand intensifier unit used in conjunction with the method of the present invention.

FIGS. 3 (a-b) illustrate alternative views of the sand intensifier unit used in conjunction with the method of the present invention.

DESCRIPTION OF ILLUSTRATIVE EMBODIMENTS

Figure 1:
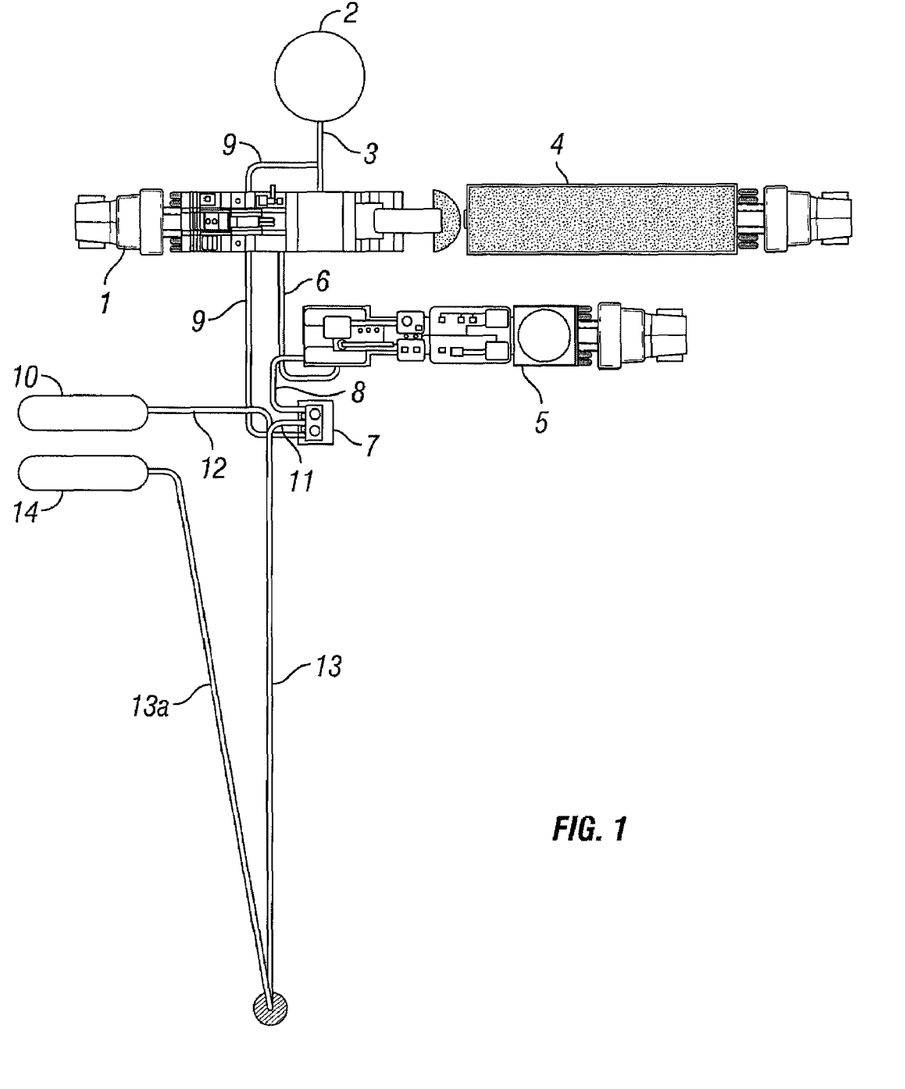
FIG. 1 illustrates fracture-stimulating equipment used in conjunction with the method of the present invention.

FIG. 1 illustrates fracture-stimulating equipment used in conjunction with a first embodiment of the method of the present invention. A conventional blender unit (1) is shown connected to a fluid storage device (2) via a first conduit (3). The blender unit (1) contains a blender tub (not shown) that is capable of mixing two or more materials together. A conventional sand trailer (4) is shown connected to the blender unit (1). The sand trailer (4) typically includes one or more proppant containers (not shown), which are used to transfer proppant to the mixing tub (not shown) of the blender unit (1). The blender unit (1) is shown further connected to a conventional high-pressure pump (5) by a second conduit (6). The high-pressure pump (5) is in turn connected to a conventional sand intensifier unit (7) by a third conduit (8). The sand intensifier unit (7) is then connected back to the first conduit (3), and subsequently the fluid storage device (2), via a reflux conduit (9).

A first nitrogen/carbon dioxide storage tank and pump (10) is schematically shown connected to a short conduit (11) extending from the sand intensifier unit (7). The first nitrogen/carbon dioxide storage tank and pump (10) is connected to the short conduit (11) via a fourth conduit (12). Those connections are then attached to a manifold connection (not shown), which is in turn connected to a first wellhead conduit (13) that extends directly to the wellhead. A second nitrogen/carbon dioxide storage tank and pump (14) is shown extending directly to the wellhead via a second wellhead conduit (13a), bypassing the sand intensifier unit (7) altogether. All of the above-referenced equipment is of a conventional nature and is commonly used in the industry. The specific number of trucks/trailers/tanks is illustrative in nature and is not meant to be limiting. One of skill in the art will appreciate that additional trucks/trailers/tanks can be used to meet the specific requirements of a particular job design.

Figure 2A:
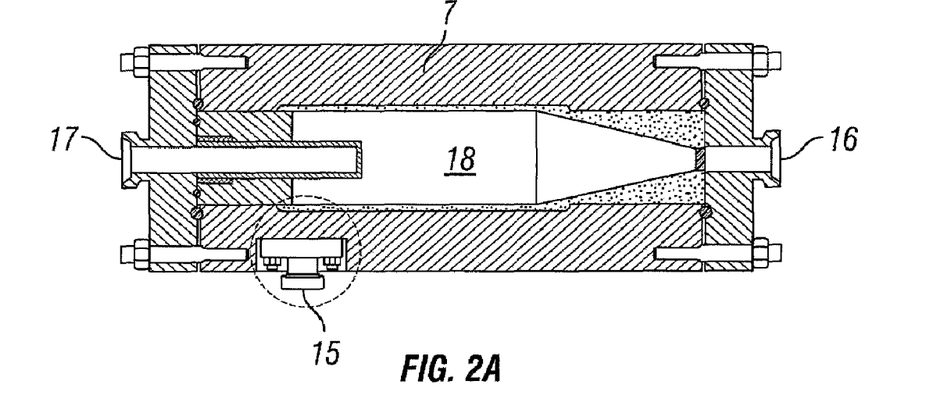
Figure 2B:
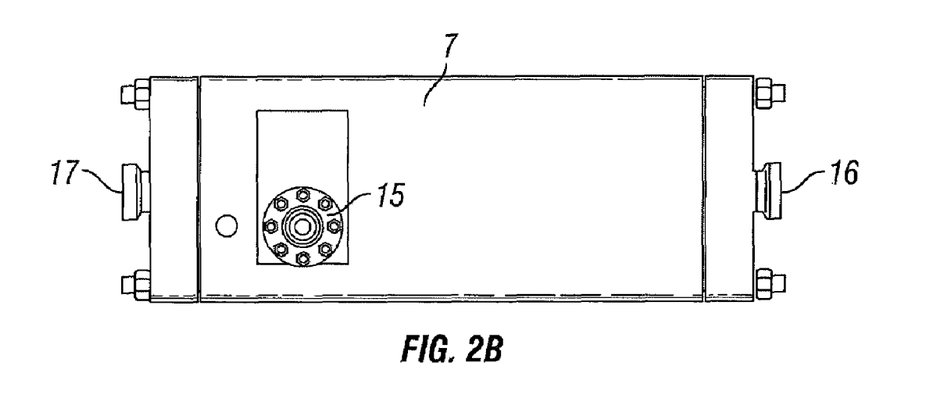
Figure 2C:
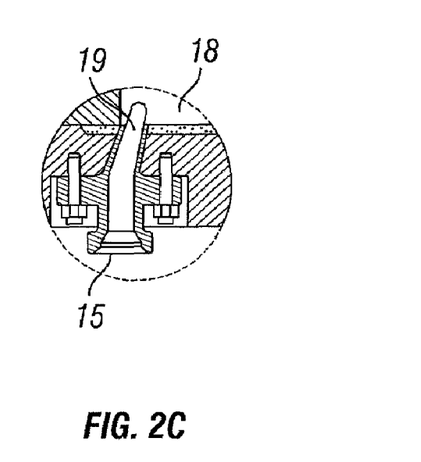

FIGS. 2(a-c) show multiple views of the sand intensifier unit (7) used in conjunction with a first embodiment of the method of the present invention. In FIG. 2(a), the sand intensifier unit (7) is shown in longitudinal cross-section and includes an intake flange (15), an outlet flange (16), and a reflux flange (17). The sand intensifier unit (7) also includes a cone-shaped receptacle (18) located in the central interior of the unit (7). The cone-shaped receptacle (18) is preferably lined with rubber or epoxy to prevent erosion. FIG. 2(b) shows a longitudinal exterior view of the sand intensifier unit (7), including the intake flange (15), outlet flange (16), and reflux flange (17), however the sand intensifier unit (7) has been effectively rotated on its longitudinal axis roughly 90 degrees from FIG. 2(a) such that the intake valve (15) appears on the top. FIG. 2(c) shows a cutout view of the intake flange (15), where the bore (19) of the intake flange (15) enters the cone-shaped receptacle (18) at an angle.

Figure 3A:
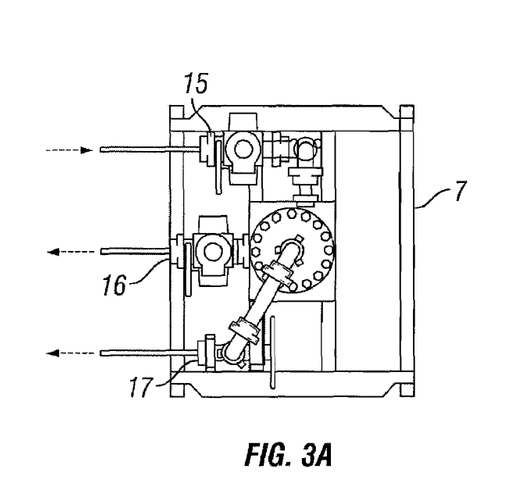
Figure 3B:
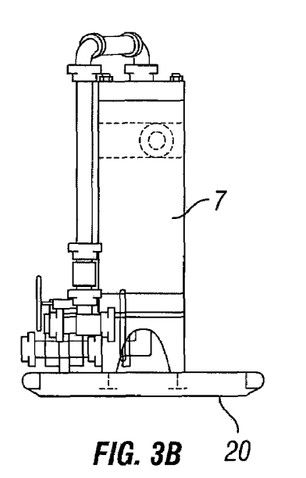

FIGS. 3 (a-b) show alternative views of the sand intensifier unit (7) used in conjunction with a first embodiment of the method of the present invention. FIG. 3(a) shows an exterior view from the top of the intensifier unit (7) and includes the intake flange (15), the outlet flange (16), and the reflux flange (17), including the outer hardware attached to each. FIG. 3(b) shows an exterior upright view of the sand intensifier unit (7), with the lower portion of the unit (7) mounted on a skid (20). The skid (20) is essentially a generic metallic platform that allows for easy transportation and offloading of whatever apparatus is secured to it. Again, the sand intensifier unit (7) as shown in FIG. 1, FIGS. 2(a-c). and FIGS. 3(a-b) is of a conventional nature and is commonly used in the industry.

In the first embodiment of the method of the present invention (and with reference to FIG. 1), the fluid storage device (2) contains an uncomplexed fluid, which in this embodiment is preferably clay-stabilized or gelled water, but can be any suitable fluid including a methanol water or a hydrocarbon-based fluid. The sand trailer (4) contains proppant, which in this embodiment is preferably LiteProp™ (which is a lightweight proppant comprised of ground nut shells coated with a protective or hardened coating), but may be any suitable proppant such as sand, glass, plastic, ceramic, and/or metallic particles. The blender unit (1) draws fluid from the fluid storage device (2) through the first conduit (3), and further draws proppant from the sand trailer (4), and mixes the two in the blender tub (not shown) to form a slurry. The proppant concentration of the slurry is preferably from about 25 kg/m$^3$ to a maximum of 2000 kg/m$^3$, however any suitable concentration may be used.

Once the fluid/proppant slurry is properly mixed, the blender unit (1) discharges the slurry into the high-pressure pump (5) through the second conduit (6). This discharge is preferably accomplished using low pressure (approximately 50 psi), but higher pressures may be used. The high-pressure pump (5) "ramps up" the pressure and pumps the slurry under high pressure to the sand intensifier unit (7) through the third conduit (8). While the slurry is preferably pumped at a rate and pressure of 1 to 2 m$^3$/min and up to a design maximum of 70,000 kPa, respectively, any suitable rate and pressure may be used. As shown in FIGS. 2(a) and (c), the slurry enters the sand intensifier unit (7) at the intake flange (15) and is forced through the intake flange bore (19) and into the cone-shaped receptacle (18).

The design of the cone-shaped receptacle (18) effectively creates a centrifuge. This centrifuge creates centrifugal force, which in conjunction with gravity removes the majority of fluid from the proppant, thereby separating the slurry. The partially dehydrated or "wet" proppant drops to the bottom of the cone-shaped receptacle (18) and exits the sand intensifier unit (7) via the outlet flange (16). The separated fluid is forced to the top of the cone-shaped receptacle (18) and is removed from the sand intensifier unit (7) via the reflux flange (17). The separated fluid is then returned to the fluid storage device (2) through the reflux conduit (9) and the first conduit (3). The wet proppant preferably contains 5% or less of the fluid from the original slurry as it exits the sand intensifier unit (7), however different concentrations may be appropriate based on the formation to be fracture-stimulated.

As shown in FIG. 1, the wet proppant is forced into the short conduit (11), and eventually reaches a manifold fitting (not shown). Simultaneously, the first nitrogen/carbon dioxide storage tank and pump (10) forces gaseous nitrogen, liquid carbon dioxide, or a combination of both, under high pressure through the fourth conduit (12) until it reaches the same manifold fitting (not shown). Preferably, 100% gaseous nitrogen is used, however, any blend of gaseous nitrogen and liquid carbon dioxide may be used, up to and including 100% liquid carbon dioxide.

Once at the manifold fitting (not shown), the nitrogen/carbon dioxide combines with the wet proppant and delivers it to the wellhead (via the first wellhead conduit (13)). The combined stream of wet proppant and gaseous nitrogen/liquid carbon dioxide is then pumped by the nitrogen/carbon dioxide pump (10) to the wellhead and into the well through a work string (not shown) to fracture-stimulate the down hole formation. The partially dehydrated nature of the proppant allows a higher proppant concentration to be delivered to the wellhead as opposed to pumping the proppant-laden slurry directly from the high-pressure pump (5). According to one embodiment of the present invention, the partially dehydrated proppant has a concentration at the wellhead of between 20 kg/m$^3$ and 150 kg/m$^3$ with respect to the nitrogen/liquid carbon dioxide, however other suitable concentrations may be used.

At the same time the combined stream of wet proppant and gaseous nitrogen/liquid carbon dioxide is being pumped to the wellhead, the second nitrogen/carbon dioxide storage tank and pump (14) delivers a proppant-free, high-pressure stream of gaseous nitrogen, liquid carbon dioxide, or a combination of both, through the second wellhead conduit (13a) to further the efficacy of the fracture-stimulation.

The method as disclosed above is preferably used in conjunction with the fracture-stimulation of shallow, "dry" coal bed methane wells. The method is particularly suited for this application as the introduction of water into these formations may alter the water saturation levels, thereby creating swelling and damaging the formation. However, the method disclosed above may be used in conjunction with the fracture-stimulation of any water-sensitive formations.

Figure 4:
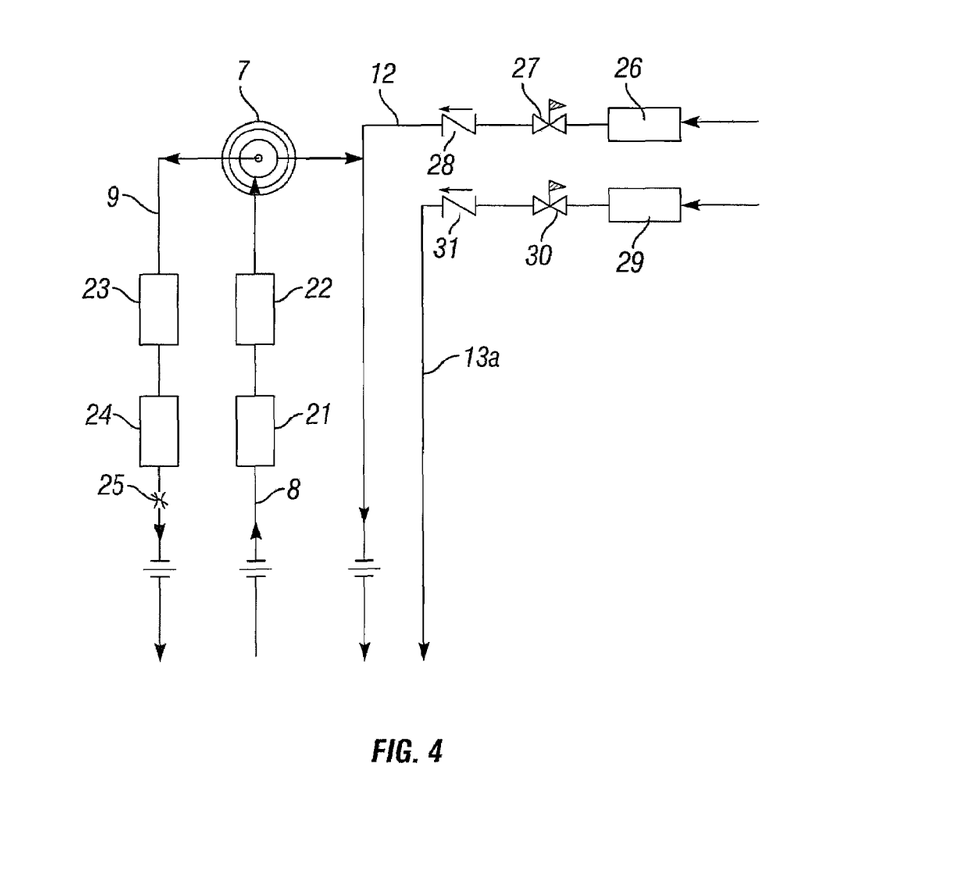
FIG. 4 illustrates a schematic representation of the method of the present invention.

FIG. 4 illustrates a schematic representation of the first embodiment of the method of the present invention, including the equipment necessary to electronically measure, control, and ultimately automate the method. As described previously, the blender unit (not shown) draws fluid from the fluid storage device (not shown), draws proppant from the sand trailer (not shown), and mixes the two together to form a slurry. The blender unit (not shown) then discharges the slurry into the high-pressure pump (not shown), which in turn pumps the slurry to the sand intensifier unit (7). Located along what has been previously identified as the third conduit (8), is a flow meter (21) and a density meter (22). These two devices allow the flow rate and the density of the slurry to be measured and recorded as the slurry enters the sand intensifier unit (7).

The slurry is centrifugally separated as described above, and the fluid is removed from the sand intensifier unit (7) via the reflux conduit (9). Located along the reflux conduit (9) is another flow meter (23) and density meter (24). Also located along the reflux conduit (9) is a reflux choke (25). Accordingly, the flow rate and density of the separated fluid can measured and recorded, and the flow rate can be diminished and/or stopped. This allows for the level of hydration of the proppant that will eventually be delivered to the wellhead to be manipulated. This manipulation is beneficial, as different fracture-stimulation applications require proppant with different hydration levels.

FIG. 4 also schematically illustrates the first nitrogen/carbon dioxide stream being pumped along the fourth conduit (12) to be combined with the wet proppant and deliver it to the wellhead. Prior to intersecting the wet proppant, the fourth conduit (12) not only includes a flow meter (26), but also includes a manual plug valve (27) and check valve (28). This equipment jointly allows the nitrogen/carbon dioxide flow to be measured and controlled. The second nitrogen/carbon dioxide stream is shown being pumped along the second wellhead conduit (13a) to deliver a proppant-free stream of gaseous nitrogen, liquid carbon dioxide, or a combination of both to further the fracture-stimulation efficacy. As with the fourth conduit (12) referenced above, the second wellhead conduit (13a) includes a flow meter (29), a manual plug valve (30), and a check valve (31). As before, this equipment allows the proppant-free nitrogen/carbon dioxide flow to be measured and controlled. It should be noted that the meters, valves, and chokes used in conjunction with the method of the present invention are of a conventional nature and are commonly used in the industry.

Figure 5:
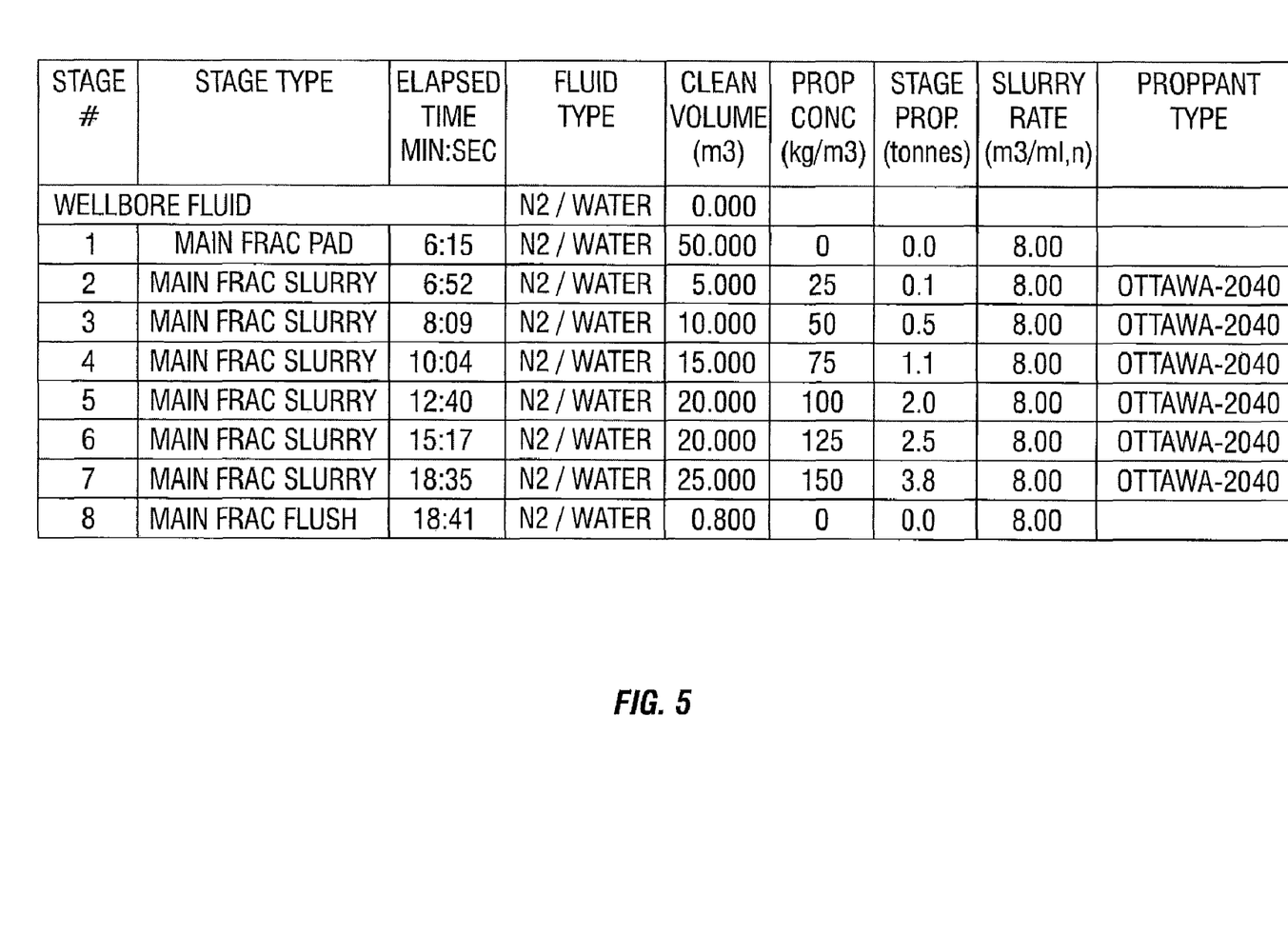
FIG. 5 illustrates a chart containing figures relating to an example of the "step" procedure of the method of the present invention.
Figure 6:
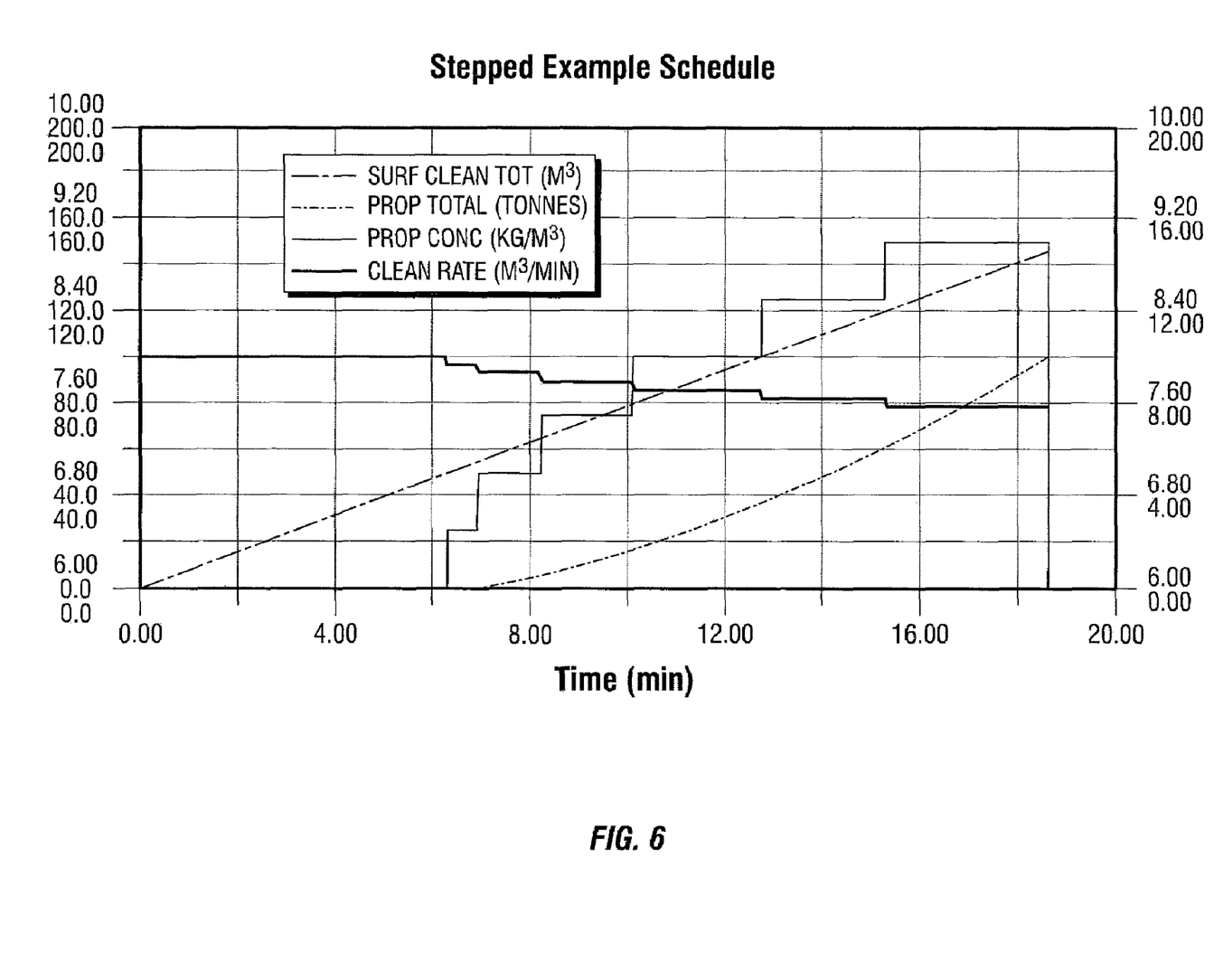
FIG. 6 illustrates a graphical representation of the figures contained in the chart of FIG. 5.

The monitoring and control equipment illustrated in FIG. 4 allow the process of delivering the wet proppant to the wellhead to be accomplished using a "step" procedure, where a measured of amount of proppant is introduced into the formation, followed by an increased amount, followed by a further increased amount, and so on until the proper proppant concentration is attained. An example of this process is illustrated in the chart in FIG. 5, where proppant concentration is increased over a period of approximately twenty minutes from zero (no proppant) to 150 kg/m$^3$. Additional fracture-stimulating factors as described in the present invention are represented in the chart, such as the carrier type (gaseous nitrogen), the proppant type, proppant delivery rate, and the volume of the proppant-free gaseous nitrogen being pumped into the formation. This chart is represented graphically in FIG. 6, where Time (min.) is located on the x-axis and Proppant Concentration (kg/m$^3$) is located on the y-axis. As is shown in FIG. 6, the proppant concentration being introduced into the formation over time (represented by the solid line) effectively forms a series of "steps."

Figure 7:
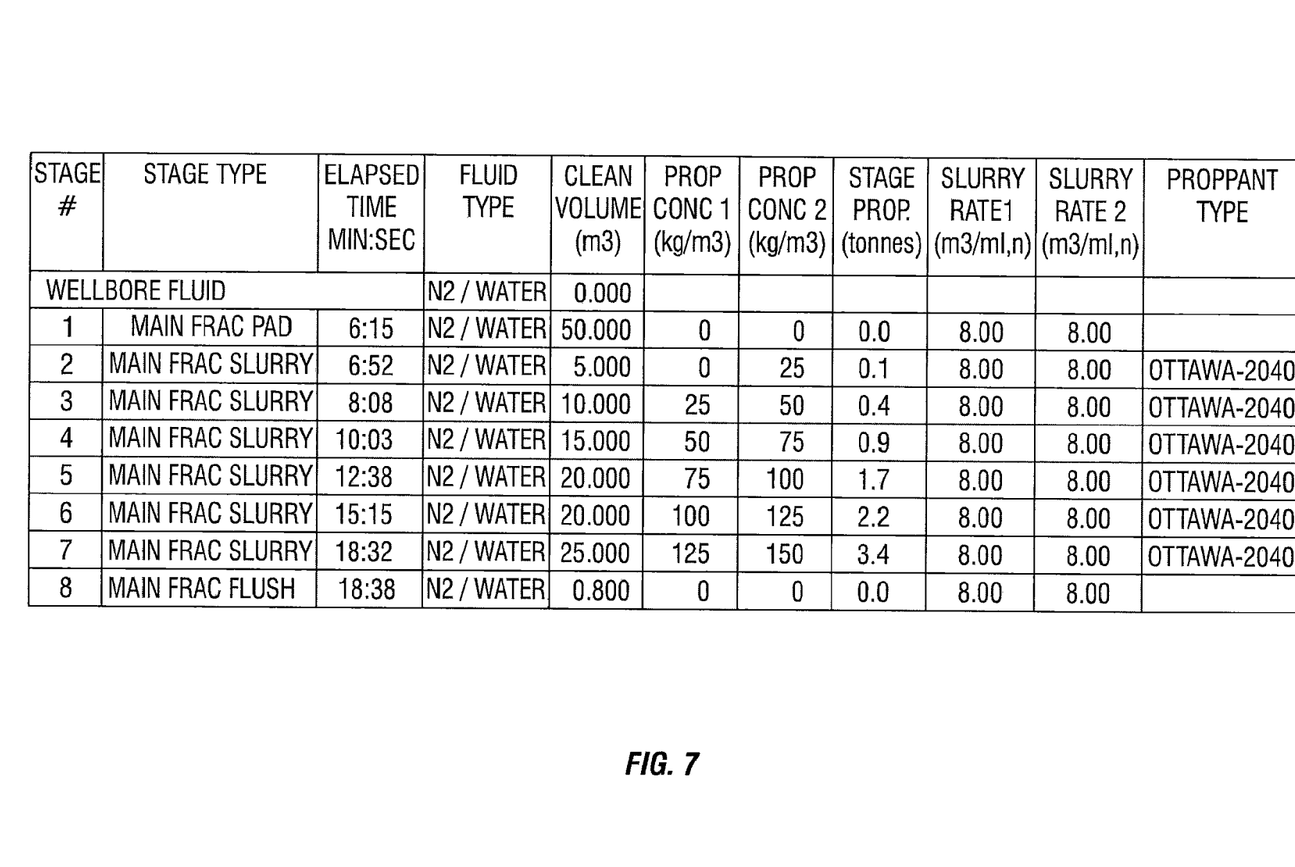
FIG. 7 illustrates a chart containing figures relating to an example of the "ramp" procedure of the method of the present invention.
Figure 8:
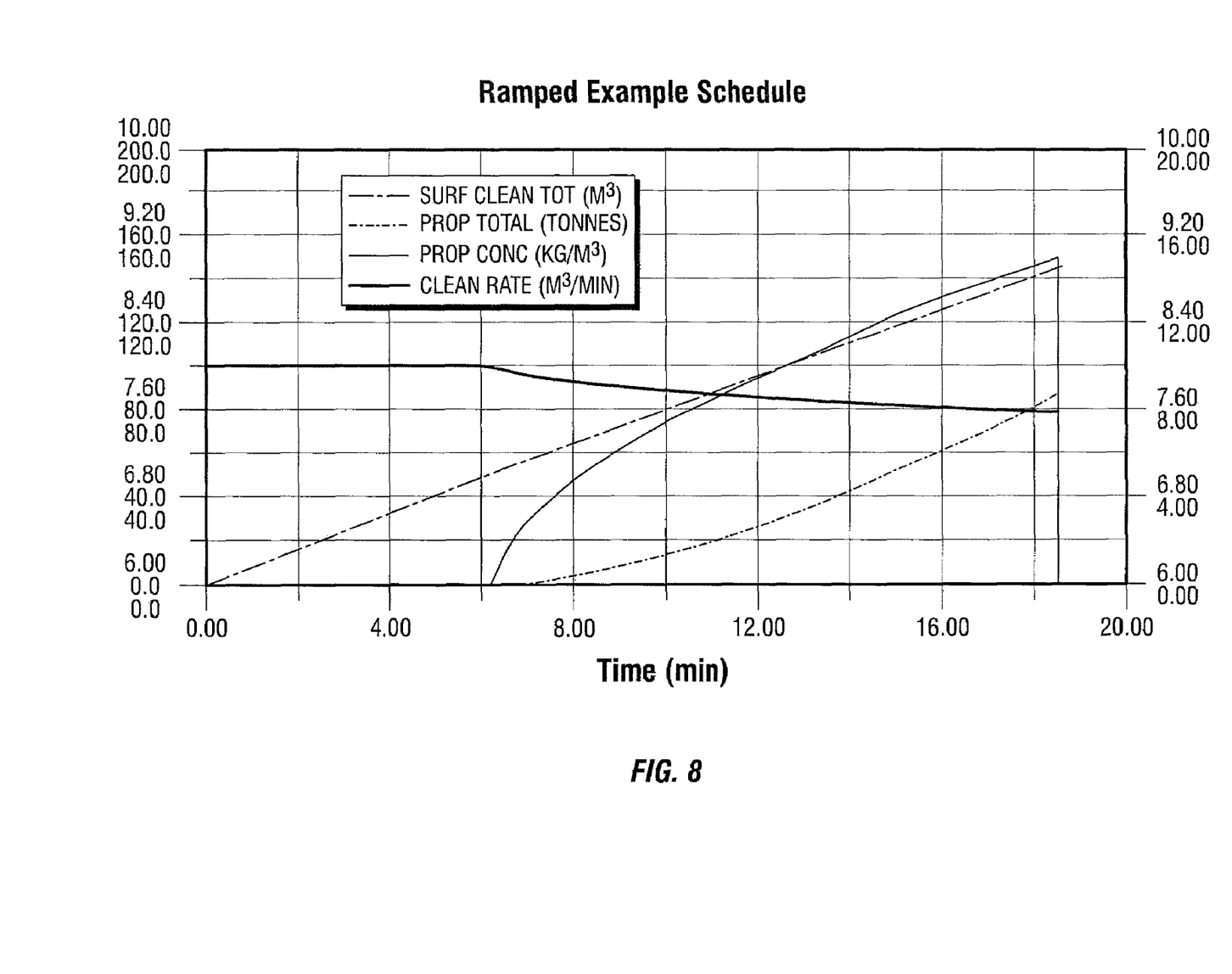
FIG. 8 illustrates a graphical representation of the figures contained in the chart of FIG. 7.

The monitoring and control equipment illustrated in FIG. 4 alternatively allow the process to be accomplished using a "ramp" procedure, where an initially small, but steadily and constantly increasing amount of proppant is introduced into the formation until the proper concentration is attained. An example of this process is illustrated in the chart in FIG. 7, where proppant concentration is again increased over a period of approximately twenty minutes from zero (no proppant) to 150 kg/m$^3$. As before, additional fracture-stimulating factors are represented in the chart, such as the carrier type (gaseous nitrogen), the proppant type, the proppant delivery rate, and the volume of the proppant-free gaseous nitrogen being pumped into the formation. While the figures appear similar to those in the chart of FIG. 6, the difference in proppant concentration becomes evident when the chart of FIG. 7 is represented graphically. FIG. 8 contains a graphical representation of the chart of FIG. 7, where Time (min.) is located on the x-axis and Proppant Concentration (kg/m$^3$) is located on the y-axis. As is shown in FIG. 8, the proppant concentration being introduced into the formation over time (represented by the solid line) effectively forms a "ramp." Hence, the process of delivering the wet proppant to the wellhead as described in the present invention can be accomplished using a "step" procedure or a "ramp" procedure.

The monitoring and control equipment illustrated in FIG. 4 also allows the method as disclosed above to be highly automated. The entire method may be managed electronically and remotely. Further, because the entire system is monitored (e.g., flow meters and density meters) and flow manipulated (e.g., reflux chokes, check valves, and plug valves) the method may be performed in compliance with a predetermined engineering program. The specific engineering program will depend on the formation to be fracture-stimulated.

While only a first embodiment of the method of the present invention has been discussed for purposes of this disclosure, additional embodiments encompassing numerous changes to the design and function of the method of the present invention may be made by those skilled in the art. All such changes are encompassed within the scope and spirit of the following claims.

What is claimed is:

1. A method of fracture stimulating a formation in a subterranean well bore, the method comprising:
   mixing proppant with a fluid to form a slurry;
   removing at least a portion of the fluid from the slurry using centrifugal forces and gravity to thereby create a partially dehydrated slurry;
   combining the partially dehydrated slurry with gaseous nitrogen;
   pumping the partially dehydrated slurry and gaseous nitrogen into the well bore at a pump rate and pressure sufficient to fracture stimulate the coal bed methane formation and;
   separately pumping proppant-free gaseous nitrogen into the well bore.

2. The method of claim 1, wherein the step of removing at least a portion of the fluid from the slurry using centrifugal forces and gravity further comprises removing about 95% or more of the fluid from the slurry.

3. The method of claim 1, further comprising monitoring the concentration of partially dehydrated slurry within the gaseous nitrogen.

4. The method of claim 3, wherein the step of monitoring the concentration of partially dehydrated slurry within the gaseous nitrogen further comprises monitoring the concentration of partially dehydrated slurry within the gaseous nitrogen using one or more density meters.

5. The method of claim 1, further comprising manipulating the concentration of partially dehydrated slurry within the gaseous nitrogen.

6. The method of claim 5, wherein the step of manipulating the concentration of partially dehydrated slurry within the gaseous nitrogen further comprises manipulating the concentration of partially dehydrated slurry within the gaseous nitrogen using one or more valves.

7. The method of claim 1, further comprising recycling the fluid removed from the slurry for subsequent mixing with additional proppant to form additional slurry.

8. The method of claim 1, further comprising monitoring and manipulating the steps of mixing, removing, combining, and pumping, electronically.

9. The method of claim 1, further comprising monitoring and manipulating the steps of mixing, removing, combining, and pumping, remotely.

10. The method of claim 1, further comprising pumping the partially dehydrated slurry and gaseous nitrogen into the well bore at a pump rate and pressure sufficient to fracture stimulate the formation using a step procedure.

11. The method of claim 1, further comprising pumping the partially dehydrated slurry and gaseous nitrogen into the well bore at a pump rate and pressure sufficient to fracture stimulate the formation using a ramp procedure.

12. The method of claim 1, wherein the fluid at least partially comprises water.

13. The method of claim 1, wherein the fluid at least partially comprises an alcohol.

14. The method of claim 1, wherein the fluid at least partially comprises a hydrocarbon.

15. The method of claim 1, wherein the proppant at least partially comprises ground nut shells coated with a protective or hardened coating.

16. The method of claim 1, where in the proppant at least partially comprises fracturing sand.

17. The method of claim 1, where in the proppant at least partially comprises a metallic particle.

18. The method of claim 1, where in the proppant at least partially comprises a plastic particle.

19. The method of claim 1, where in the proppant at least partially comprises a ceramic particle.

20. A method of fracture stimulating a formation in a subterranean well bore, the method comprising:
   mixing proppant with a fluid to form a slurry;
   removing at least a portion of the fluid from the slurry using centrifugal forces and gravity to thereby create a partially dehydrated slurry;
   combining the partially dehydrated slurry with gaseous nitrogen;
   pumping the partially dehydrated slurry and gaseous nitrogen into the well bore at a pump rate and pressure sufficient to fracture stimulate the formation; and
   separately pumping proppant-free liquid carbon dioxide into the well bore.

21. The method of claim 20, wherein the step of removing at least a portion of the fluid from the slurry using centrifugal forces and gravity further comprises removing about 95% or more of the fluid from the slurry.

22. The method of claim 20, further comprising monitoring the concentration of partially dehydrated slurry within the gaseous nitrogen.

23. The method of claim 22, wherein the step of monitoring the concentration of partially dehydrated slurry within the gaseous nitrogen further comprises monitoring the concentration of partially dehydrated slurry within the gaseous nitrogen using one or more density meters.

24. The method of claim 20, further comprising manipulating the concentration of partially dehydrated slurry within the gaseous nitrogen.

25. The method of claim 24, wherein the step of manipulating the concentration of partially dehydrated slurry within the gaseous nitrogen further comprises manipulating the concentration of partially dehydrated slurry within the gaseous nitrogen using one or more valves.

26. The method of claim 20, further comprising recycling the fluid removed from the slurry for subsequent mixing with additional proppant to form additional slurry.

27. The method of claim 20, further comprising monitoring and manipulating the steps of mixing, removing, combining, and pumping, electronically.

28. The method of claim 20, further comprising monitoring and manipulating the steps of mixing, removing, combining, and pumping, remotely.

29. The method of claim 20, further comprising pumping the partially dehydrated slurry and gaseous nitrogen into the well bore at a pump rate and pressure sufficient to fracture stimulate the formation using a step procedure.

30. The method of claim 20, further comprising pumping the partially dehydrated slurry and gaseous nitrogen into the well bore at a pump rate and pressure sufficient to fracture stimulate the formation using a ramp procedure.

31. A method of fracture stimulating a formation in a subterranean well bore, the method comprising:
mixing proppant with a fluid to form a slurry;
removing at least a portion of the fluid from the slurry using centrifugal forces and gravity to thereby create a partially dehydrated slurry;
combining the partially dehydrated slurry with liquid carbon dioxide; and
pumping the partially dehydrated slurry and liquid carbon dioxide into the well bore at a pump rate and pressure sufficient to fracture stimulate the formation.

32. The method of claim 31, wherein the step of removing at least a portion of the fluid from the slurry using centrifugal forces and gravity further comprises removing about 95% or more of the fluid from the slurry.

33. The method of claim 31, further comprising monitoring the concentration of partially dehydrated slurry within the liquid carbon dioxide.

34. The method of claim 33, wherein the step of monitoring the concentration of partially dehydrated slurry within the liquid carbon dioxide further comprises monitoring the concentration of partially dehydrated slurry within the liquid carbon dioxide using one or more density meters.

35. The method of claim 31, farther comprising manipulating the concentration of partially dehydrated slurry within the liquid carbon dioxide.

36. The method of claim 35, wherein the step of manipulating the concentration of partially dehydrated slurry within the liquid carbon dioxide further comprises manipulating the concentration of partially dehydrated slurry within the liquid carbon dioxide using one or more valves.

37. The method of claim 31, further comprising recycling the fluid removed from the slurry for subsequent mixing with additional proppant to form additional slurry.

38. The method of claim 31, further comprising monitoring and manipulating the steps of mixing, removing, combining, and pumping, electronically.

39. The method of claim 31, further comprising monitoring and manipulating the steps of mixing, removing, combining, and pumping, remotely.

40. The method of claim 31, further comprising pumping the partially dehydrated slurry and liquid carbon dioxide into the well bore at a pump rate and pressure sufficient to fracture stimulate the formation using a step procedure.

41. The method of claim 31, further comprising pumping the partially dehydrated slurry and liquid carbon dioxide into the well bore at a pump rate and pressure sufficient to fracture stimulate the formation using a ramp procedure.

42. The method of claim 31, further comprising separately pumping proppant-free gaseous nitrogen into the well bore.

43. The method of claim 31, further comprising separately pumping proppant-free liquid carbon dioxide into the well bore.

44. The method of claim 31, further comprising separately pumping a mixture of proppant-free liquid carbon dioxide and gaseous nitrogen into the well bore.

45. A method of fracture stimulating a formation in a subterranean well bore, the method comprising:
mixing proppant with a fluid to form a slurry;
removing at least a portion of the fluid from the slurry using centrifugal forces and gravity to thereby create a partially dehydrated slurry;
combining the partially dehydrated slurry with a mixture of liquid carbon dioxide and gaseous nitrogen; and
pumping the partially dehydrated slurry and liquid carbon dioxide and gaseous nitrogen mixture into the well bore at a pump rate and pressure sufficient to fracture stimulate the formation.

46. The method of claim 45, wherein the step of removing at least a portion of the fluid from the slurry using centrifugal forces and gravity further comprises removing about 95% or more of the fluid from the slurry.

47. The method of claim 45, further comprising monitoring the concentration of partially dehydrated slurry within the liquid carbon dioxide and gaseous nitrogen mixture.

48. The method of claim 47, wherein the step of monitoring the concentration of partially dehydrated slurry within the liquid carbon dioxide and gaseous nitrogen mixture further comprises monitoring the concentration of partially dehydrated slurry within the liquid carbon dioxide and gaseous nitrogen mixture using one or more density meters.

49. The method of claim 45, further comprising manipulating the concentration of partially dehydrated slurry within the liquid carbon dioxide and gaseous nitrogen mixture.

50. The method of claim 49, wherein the step of manipulating the concentration of partially dehydrated slurry within the liquid carbon dioxide and gaseous nitrogen mixture further comprises manipulating the concentration of partially dehydrated slurry within the liquid carbon dioxide and gaseous nitrogen mixture using one or more valves.

51. The method of claim 45, further comprising recycling the fluid removed from the slurry for subsequent mixing with additional proppant to form additional slurry.

52. The method of claim 45, further comprising monitoring and manipulating the steps of mixing, removing, combining, and pumping, electronically.

53. The method of claim 45, further comprising monitoring and manipulating the steps of mixing, removing, combining, and pumping, remotely.

54. The method of claim 45, further comprising pumping the partially dehydrated slurry and liquid carbon dioxide and gaseous nitrogen mixture into the well bore at a pump rate and pressure sufficient to fracture stimulate the formation using a step procedure.

55. The method of claim 45, further comprising pumping the partially dehydrated slurry and liquid carbon dioxide and gaseous nitrogen mixture into the well bore at a pump rate and pressure sufficient to fracture stimulate the formation using a ramp procedure.

56. The method of claim 45, further comprising separately pumping proppant-free gaseous nitrogen into the well bore.

57. The method of claim 45, further comprising separately pumping proppant-free liquid carbon dioxide into the well bore.

58. The method of claim 45, further comprising separately pumping a mixture of proppant-free liquid carbon dioxide and gaseous nitrogen into the well bore.

59. A method of fracture stimulating a formation in a subterranean well bore, the method comprising:

mixing proppant with a fluid to form a slurry;

removing at least a portion of the fluid from the slurry using centrifugal forces and gravity to thereby create a partially dehydrated slurry;

combining the partially dehydrated slurry with gaseous nitrogen;

pumping the partially dehydrated slurry and gaseous nitrogen into the well bore at a pump rate and pressure sufficient to fracture stimulate the coal bed methane formation; and separately pumping a mixture of proppant-free liquid carbon dioxide and gaseous nitrogen into the well bore.

* * * * *

UNITED STATES PATENT AND TRADEMARK OFFICE
CERTIFICATE OF CORRECTION

PATENT NO. : 7,451,820 B2 Page 1 of 1
APPLICATION NO. : 11/118231
DATED : November 18, 2008
INVENTOR(S) : Blair Albers et al.

It is certified that error appears in the above-identified patent and that said Letters Patent is hereby corrected as shown below:

Column 9, Line 51: after Claim 31, delete "farther" and insert --further--

Signed and Sealed this

Twenty-fourth Day of February, 2009

JOHN DOLL
*Acting Director of the United States Patent and Trademark Office*